United States Patent [19]
Hirth et al.

[11] Patent Number: 4,986,968
[45] Date of Patent: Jan. 22, 1991

[54] OZONE GENERATOR

[75] Inventors: Michael Hirth, Mellingen; Günter Mechtersheimer, Nussbaumen, both of Switzerland

[73] Assignee: Asea Brown Boveri Limited, Baden, Switzerland

[21] Appl. No.: 486,850

[22] Filed: Mar. 1, 1990

[30] Foreign Application Priority Data

Mar. 3, 1989 [CH] Switzerland .................. 798/89-7

[51] Int. Cl.$^5$ .............................................. B01J 19/08
[52] U.S. Cl. ......................... 422/186.19; 422/186.07; 422/186.18; 422/186.21
[58] Field of Search ............ 422/186.07, 186.18, 422/186.19, 186.21

[56] References Cited

U.S. PATENT DOCUMENTS

| | | | |
|---|---|---|---|
| 3,954,586 | 5/1976 | Lowther | 204/176 |
| 3,984,697 | 10/1976 | Lowther | 250/532 |
| 4,690,803 | 9/1987 | Hirth | 422/186.18 |
| 4,774,062 | 9/1988 | Heinemann | 422/186.19 |

FOREIGN PATENT DOCUMENTS

| | | |
|---|---|---|
| 1132253 | 1/1963 | Fed. Rep. of Germany . |
| 2354209 | 5/1975 | Fed. Rep. of Germany . |
| 2065823 | 3/1976 | Fed. Rep. of Germany . |
| 2617059 | 10/1976 | Fed. Rep. of Germany . |
| 2618243 | 11/1976 | Fed. Rep. of Germany . |
| 2534033 | 2/1977 | Fed. Rep. of Germany . |
| 2658913 | 7/1978 | Fed. Rep. of Germany . |
| 3128746 | 2/1983 | Fed. Rep. of Germany . |
| 3424889 | 2/1986 | Fed. Rep. of Germany . |
| 3521985 | 11/1986 | Fed. Rep. of Germany . |
| 3830106 | 5/1989 | Fed. Rep. of Germany . |

OTHER PUBLICATIONS

Patent Abstracts of Japan, vol. 3, No. 7, 128 C34, Jan. 24, 1979.

Primary Examiner—Stephen J. Lechert, Jr.
Assistant Examiner—Nina Bhat
Attorney, Agent, or Firm—Oblon, Spivak, McClelland, Maier & Neustadt

[57] ABSTRACT

In an ozone generator with enamel dielectric, to increase the ozone yield, the latter is built up on at least two enamel layers, the layer (4) facing the discharge space (5) having a smaller dielectric constant ($\leqq 6$) than the layer (3) lying underneath.

8 Claims, 1 Drawing Sheet

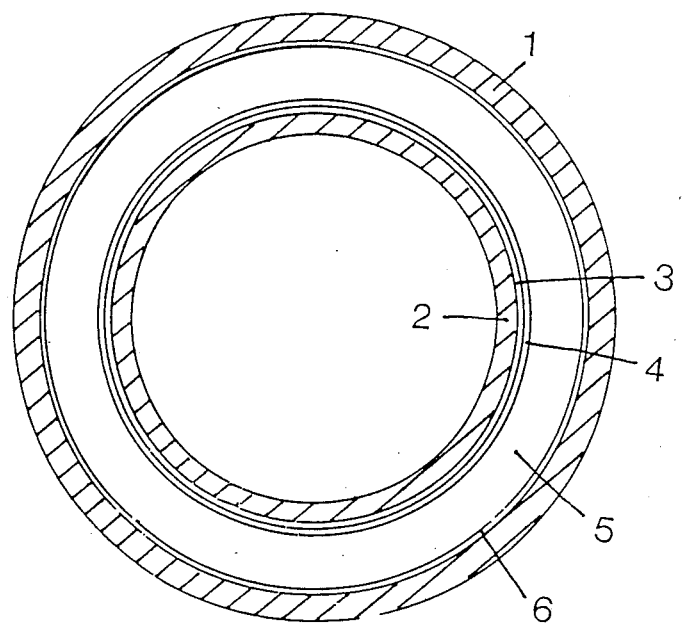

OZONE GENERATOR

BACKGROUND OF THE INVENTION

1. Field of the Invention

The invention relates to an ozone generator with a first and a second metallic electrode, with a layer of enamel on the surface of the second electrode facing the first electrode and a discharge gap between the first electrode and the enamel layer.

The invention thereby makes reference to a prior art such as arises, for example, from U.S. Pat. Specification No. 3,954,586.

2. Discussion of Background

For very many processes, extremely large quantities of ozone of the order of magnitude of hundreds of kilograms to ton per hour are necessary, and consequently they can be carried out virtually only if compact high-power ozone generators which can produce such high quantities of ozone are available.

To increase the power density of ozonizers—whether with the dielectric in the form of a tube or in the form of a plate—in the past the dielectric glass has been replaced by dielectrics based on plastic or ceramic.

In an ozone generator, the quantity of ozone Y formed per unit of discharge area is namely proportional to the electric power W per unit of area:

$$Y = K \cdot W$$

In first approximation, the electric power W is in turn proportional to the relative dielectric constant E and inversely proportional to the thickness D of the dielectric:

$$W = K' \cdot E/d$$

If glass is used as dielectric, the relative dielectric constant E is around 5. For reasons of stability, the wall thickness of such glass dielectrics must be at least 1.5 mm.

German Offenlegungsschrift 2,658,913 discloses an ozone generator which comprises a cooled internal electrode, an external electrode and a high-voltage electrode arranged concentrically in between, which are in each case coated on their outer circumferential surface with a glass-enamel dielectric. German Pat. Specification 2,534,033 discloses a high-frequency tube ozone generator in which a dielectric layer of silicate enamel or glass is applied to each of the opposite surfaces of concentrically arranged metal tubes. German Offenlegungsschrift 2,617,059 discloses the use of a thin silica gel layer as dielectric in ozone generators, which layer is applied to self-supporting metal electrodes.

German Offenlegungsschrift 2,354,209 discloses an ozone generator which consists of a self-supporting ceramic tube as dielectric, which is covered on its outer circumferential surface by a metal layer of an electrode and in which a metal tube is arranged concentrically as counter-electrode. However, such a self-supporting ceramic tube cannot be dimensioned just as thin as desired and is also very fragile.

German Offenlegungsschrift 2,065,823 discloses an ozone generator of which the electrodes consist of decarbonized steel, which are coated with a thin ceramic layer as dielectric. However, such ceramic layers have to be stoved at relatively high temperatures, which can result in a troublesome distortion of the self-supporting metal electrodes.

German Auslegeschrift 2,618,243 discloses a dielectric for ozone generators which consists of a ceramic material with $Al_2O_3$, $SiO_2$ and at least one alkaline metal oxide or alkaline earth metal oxide and has a dielectric constant between 5 and 10 and is 0.5 mm to 1 mm thick.

U.S. Pat. Specification No. 4,690,803 and German Offenlegungsschrift 3,128,746, for example, disclose ozonizers with plastic dielectric, in particular such ozonizers with titanium dioxide-filled plastic dielectric.

In the case of all the non-glass dielectrics described above, in principle the power density, and consequently the ozone yield, can be increased.

According to the findings of the applicant, the surface of the dielectric has a decisive influence on the efficiency. Dielectrics based on ceramic or synthetic resin are inferior to glass dielectrics in this respect.

SUMMARY OF THE INVENTION

Accordingly, on the basis of the prior art, one object of the invention is to provide a dielectric of the type mentioned at the beginning which has a relatively high dielectric constant and a relatively high dielectric strength, so that a high ozone yield can be achieved with thin layers of an order of magnitude of 100 μm, and which is equal to glass dielectrics in terms of efficiency.

This object is achieved according to the invention by the enamel layer consisting of a plurality of enamel layers of different dielectric constants lying one on top of the other, the enamel layer adjacent to the discharge gap having a smaller dielectric constant than the enamel layer(s) lying underneath.

In this case, the enamel of the top layer is preferably an enamel based on iron or cobalt with a dielectric constant less than or equal to 6, while the enamel of the lower layer(s) is an enamel based on titanium with a dielectric constant greater than or equal to 10, or at least contains $TiO_2$.

With the invention, dielectric capacities comparable to those of filled plastic dielectrics can be achieved with layer thicknesses less than 1 mm.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein the single figure represents a section through a tube ozonizer with a two-layered enamel dielectric.

DESCRIPTION OF THE PREFERRED EMBODIMENT

In the Figure, a first external metallic electrode in the form of a metal tube is denoted by 1, a second internal metallic electrode likewise in the form of a metal tube, preferably of high-grade steel, is denoted by 2. The second electrode 2 has on the surface facing the first electrode 1 a layer of, in the case of the example, two enamel layers 3, 4 lying one on top of the other. A discharge gap 5 as provided between the first electrode 1 and the two enamel layers 3, 4.

The lower layer 3—in a practical embodiment this consists of a plurality of individual layers of about 100 μm applied one after the other, with a total thickness of about 1 mm—consists of a titanium enamel (for example enamel 8380 of Messrs Ferro (Holland) B.V.) with increased titanium dioxide content. This addition of titanium dioxide allows dielectric constants in excess of 10 to be achieved. Such layers can be applied by known methods directly to steel tubes, preferably such tubes of high-grade steel.

For the purpose of achieving an optimum ozone yield, the uppermost enamel layer 4 consists of another enamel with small dielectric constant ($\leq 6$). Suitable for this in particular are enamels containing iron or cobalt, which are applied directly to the base layer(s) 3 with a thickness of 100–150 $\mu$m.

Examples of enamel layers are described, for example, in the "Email-Handbuch" (Enamel Handbook) of the abovementioned Messrs Ferro or else in U.S. Pat. Specification No. 3,954,586, column 17. All of the essential details of the coating operation are also explained in this publication.

To improve the ozone yield further, the inside of the external electrode 1 is provided with a further dielectric layer 6.

In applying a suitable dielectric layer to the inside surface of the metallic electrode 1, an ozone yield which corresponds to ozonizers fitted with glass dielectrics can also be obtained with dielectrics of high dielectric constant. The thickness of the dielectric coating may be between 10 $\mu$m and 1 $\mu$mm. A (material-dependent) minimum layer thickness is necessary in order to show the desired effect. If the layer thickness is too great, the total capacity of the ozonizer (series connection of the capacities) of the coating of the metal electrode 1 and of the dielectric 3, 4 is reduced to such an extent that the advantages of the high dielectric capacity are lost again. In addition, heat transfer between the gap and the (cooled) metal electrode 1 worsens. Since the applied electric voltage has to be held by the dielectric (3,4) itself, no special requirement is made on the electric strength of the coating (6).

In the case of external electrodes 1 of aluminum, the layer 6 may be an anodized oxide layer. Steel electrodes may likewise be internally anodized by previous coating with aluminum. In addition, however, coating with enamel, spray coating or coating with ceramic adhesives or casting compounds are also suitable.

The measures described above for increasing the ozone yield were described with reference to a tube ozonizer. It goes without saying that they can be applied to ozonizers of a different geometry, in particular plate ozonizors, without departing from the scope of the invention.

Obviously, numerous modifications and variations of the present invention are possible in the light of the above teachings. It is therefore to be understood that, within the scope of the appended claims, the invention may be practiced otherwise than as specifically described herein.

What is claimed as new and desired to be secured by Letters Patent of the United States is:

1. An ozone generator with a first (1) and a second metallic electrode (2), with a layer (3, 4) of enamel on the surface of the second electrode (2) facing the first electrode (1) and a discharge gap (5) between the first electrode (1) and the enamel layer (3, 4), wherein the enamel layer consists of a plurality of layers (3, 4) of different dielectric constants lying one on top of the other, the first layer (4), adjacent to the discharge gap (5), having a smaller dielectric constant than the second enamel layer(s) (3) lying underneath.

2. An ozone generator as claimed in claim 1, wherein the enamel of the first layer (4) is in particular an enamel containing iron or cobalt with a dielectric constant $\leq 6$, while the enamel of the lower layer(s) (3) is an enamel based on titanium, or at least contains $TiO_2$, with a dielectric constant $\geq 10$.

3. An ozone generator as claimed in claim 1 or 2, wherein the thickness of the second layer (3) is between 200 $\mu$m and 1 mm, that of the first layer (4) is between 50 and 150 $\mu$m.

4. An ozone generator as claimed in one of claims 1 to 3, wherein the second layer(s) (3) are applied directly to the second electrode (2), which electrode preferably consists of high-grade steel.

5. An ozone generator as claimed in one of claims 1 to 4, wherein the inside surface of the first electrode (1) is provided with an at most 1 mm thick dielectric layer (6).

6. An ozone generator as claimed in claim 5, wherein the dielectric layer (6) is an anodized oxide or enamel layer.

7. An ozone generator as claimed in claim 6, wherein the first electrode (1) consists of steel, the surface of which facing the discharge space (5) has been previously coated with aluminum before applying the anodized oxide layer.

8. An ozone generator as claimed in claim 5, wherein the dielectric layer (6) is a ceramic adhesive or a ceramic casting compound.

* * * * *